Aug. 31, 1943.    J. C. DUDLEY    2,328,378
BUMPER
Filed May 16, 1941
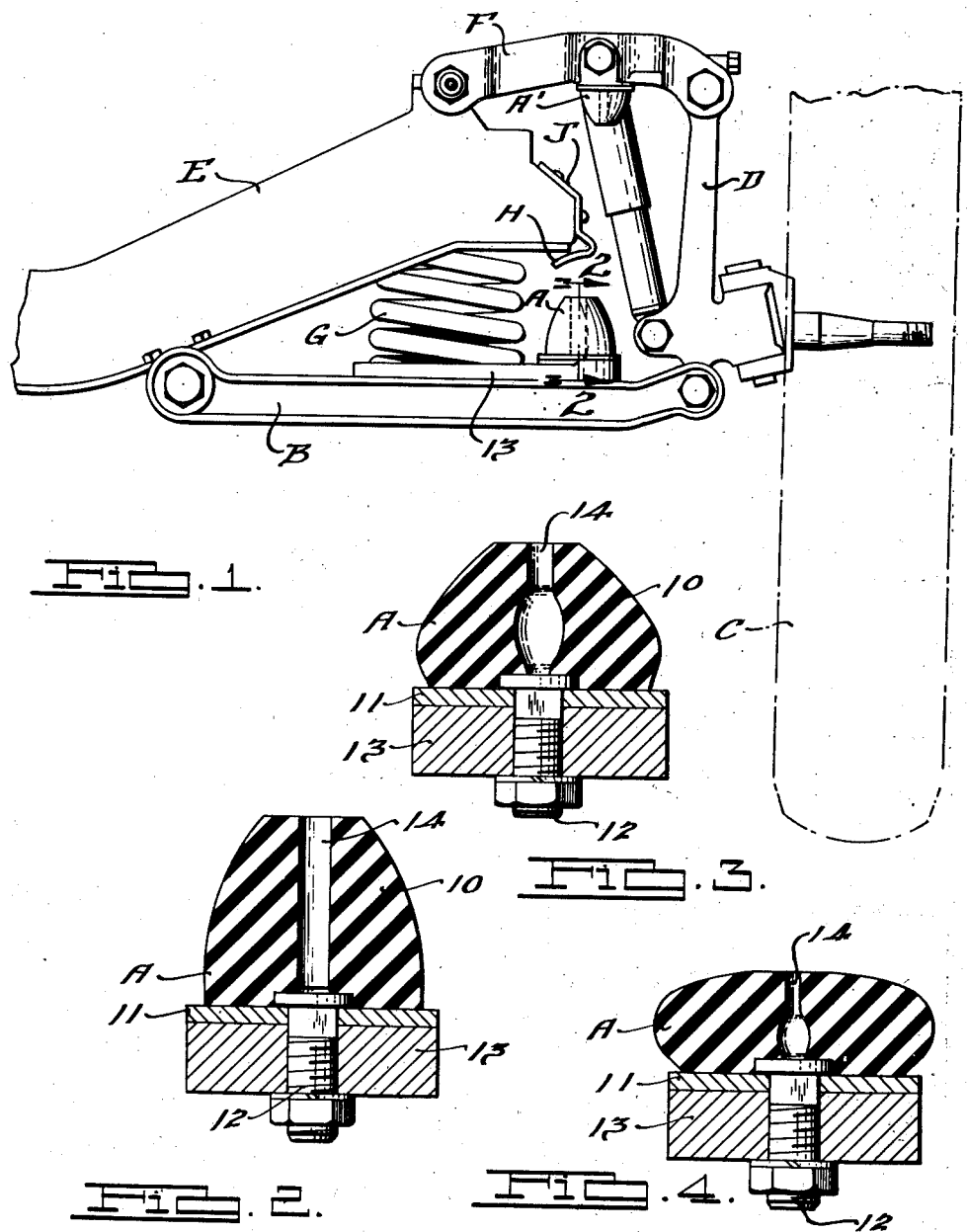
INVENTOR
John C. Dudley.
BY
ATTORNEYS.

Patented Aug. 31, 1943

2,328,378

UNITED STATES PATENT OFFICE 2,328,378

BUMPER

John C. Dudley, Detroit, Mich., assignor to Chrysler Corporation, Highland Park, Mich., a corporation of Delaware Application May 16, 1941, Serial No. 393,698

3 Claims. (Cl. 267—63)

This invention relates to bumpers and has particular reference to improvements in plastic bumpers used to check impacts.

While my invention is capable of use under a wide variety of conditions and in connection with many devices, it is especially beneficial for use in connection with motor vehicle wheel suspension systems wherein a bumper is subjected to repeated blows of a force of relatively great magnitude.

Heretofore, difficulty has been experienced in providing a bumper having the desired resilience or shock-absorbing properties and which will have a life under ordinary usage commensurate with the life of other parts of the motor vehicle. With prior bumpers, the plastic body, usually of commercial rubber compound, cracks and fails to operate properly due to impacts received during the vehicle operation. Heat developed in the bumper body also contributed to premature failure. If the bumpers were formed of a rubber of increasing hardness in an effort to prevent their premature destruction, then the desired yielding properties of the rubber were sacrificed.

It is an object of my invention to provide a bumper which will overcome the failures experienced with prior known bumpers.

Another object is to provide a bumper having improved operating characteristics; a bumper having a life appreciably longer than prior known bumpers; a bumper which will not develop heat to the extent of prior bumpers under the same operating conditions.

An additional object is to provide a bumper which will accommodate use of a harder rubber without sacrificing the desired deflection rate in comparison with a standard bumper of the same general size.

Further objects and advantages of my invention will be more apparent from the following illustrative description of a specific embodiment thereof, reference being had to the accompanying drawing in which:

Fig. 1 is a front elevational view of a vehicle wheel suspension showing my invention applied thereto.

Fig. 2 is a sectional elevational view of my bumper, the section being taken as indicated by line 2—2 of Fig. 1.

Fig. 3 is a view of the Fig. 2 bumper when under impact load.

Fig. 4 is a like view wherein the bumper is deflected still further.

Referring to the drawing I have shown my bumper assembly A mounted on the lower swinging control arm B of a well-known independent suspension system for vehicle ground wheel C. This wheel is carried by support arm D which is swingingly mounted on frame E by lower arm B and upper control arm F. The usual coil spring G supports the frame E on arm B for springing action to allow wheel C to rise and fall. When the wheel rises relative to the frame, bumper A comes into action provided the relative movement is sufficiently great and acts against the frame abutment H to deflect the bumper as in Figs. 3 and 4 and thus limits the wheel displacement with a cushioning action.

Bumper A comprises a body 10 of suitable plastic such as "rubber" which term is employed in my specification and claims to embody any rubber-composition or the commercial so-called rubber substitutes or artificial rubber of the type known as neoprene or Duprene.

The body 10 is bonded to plate 11 and to the head of a fastener 12 suitable for attaching the bumper A to spring seat 13 which, in turn, is secured to arm B. Body 10 is of general truncated frusto-conical shape preferably modified to provide a curved outwardly bulging side boundary wall. The tapering body is formed, preferably by molding, with an opening therethrough at 14, this opening being preferably cylindrical and extending along the axis of body 10.

The opening 14 ventilates the rubber body and facilitates heat dissipation so that its life is materially extended. Furthermore this opening softens the bumper thereby making possible the use of a harder rubber without sacrificing deflection rate. I have thus determined that my bumper formed of 60 hard rubber provides about the same deflection as a bumper of 50 hard rubber of the same shape but without the opening 14. My invention therefore enables the use of a smaller volume of rubber and a harder stock without sacrificing deflection limits. My bumper will absorb much higher impact load, over conventional bumpers, without breaking owing to various factors including the aforesaid heat dissipation and also in that the rubber under deflection flows not only outwardly but inwardly at opening 14 as seen in Figs. 3 and 4.

By preference the plate 11 projects shelf-like beyond the base of body 10. This prevents the rubber from bulging around and below the edges of plate 11 and avoids tendency of the rubber to crack and fail at the base region of the body 10.

In Fig. 1 I have illustrated another of my bumpers A' carried by arm F and engageable with frame abutment J for limiting downward displacement of wheel C relative to frame E.

The diameter of opening 14 is preferably such that an opening is preserved in said body and especially at the core thereof when the bumper is deformed to half its original length which, for this type of bumper, is approximately the limit of its deformation under ordinary conditions of usage.

I claim:

1. A bumper of the character described comprising a rubber body of approximate frusto-conical shape having an opening axially therein, a support bonded to the base of said body and extending transversely to said axis, said support projecting beyond said body from around said base to freely accommodate bulging of base portions of said body and to support such portions when said body is subjected to axial impact.

2. A bumper of the character described comprising a rubber body of approximate frusto-conical shape having an opening formed axially therein for at least the major portion of its length, and a plate bonded to the base portion of said body, said body being free to bulge outwardly adjacent said plate when subject to axial blow at its apex portion.

3. A bumper of the character described comprising a body of non-metallic deformable yielding material, said body when under static condition being of approximate truncated frusto-conical shape modified to present an outwardly bulging side boundary wall curving between the base and apex of said body, said body being adapted for support at said base and to receive an impact at said apex in the general direction of its axis, said body having an axial opening extending through said apex and inwardly therefrom toward said base for at least the major portion of the axial length of said body thereby to ventilate said body and accommodate deformation thereof when subjected to said impact, and a support plate extending transversely of said axis and bonded to said body at its said base, said plate extending transversely of said axis and projecting outwardly from around said base to provide a shelf-like support for portions of said body which are deformed outwardly when said body is subjected to impact as aforesaid.

JOHN C. DUDLEY.